US010476854B2

(12) United States Patent
Arora

(10) Patent No.: US 10,476,854 B2
(45) Date of Patent: Nov. 12, 2019

(54) QUANTUM KEY DISTRIBUTION LOGON WIDGET

(71) Applicant: Bank of America Corporation, Charlotte, NC (US)

(72) Inventor: Ashish Arora, Issaquah, WA (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 209 days.

(21) Appl. No.: 15/492,187

(22) Filed: Apr. 20, 2017

(65) Prior Publication Data
US 2018/0309571 A1  Oct. 25, 2018

(51) Int. Cl.
H04L 29/06 (2006.01)
H04L 9/08 (2006.01)

(52) U.S. Cl.
CPC ........ H04L 63/0435 (2013.01); H04L 9/0858 (2013.01); H04L 63/061 (2013.01); H04L 63/1475 (2013.01)

(58) Field of Classification Search
CPC ....... H04L 9/0852; H04L 9/0859; H04L 9/08; H04L 63/0435; H04L 63/1475; H04L 2209/80
See application file for complete search history.

(56) References Cited

U.S. PATENT DOCUMENTS 7,735,116 B1 * 6/2010 Gauvin ................ G06F 21/552 713/153
8,744,075 B2 6/2014 Tanaka
(Continued)

FOREIGN PATENT DOCUMENTS

CA 2886849 10/2016
CN 101834724 9/2010
(Continued)

OTHER PUBLICATIONS

Quantum Key Distribution, Wikipedia, retrieved from https://en.wikipedia.org/wiki/Quantum_key_distribution, on Mar. 3, 2017; 11 pages.
(Continued)

Primary Examiner — Linglan E Edwards
Assistant Examiner — William B Jones
(74) Attorney, Agent, or Firm — Michael A. Springs; Moore & Van Allen PLLC; James C. Edwards

(57) ABSTRACT

A system implements a QKD-secured logon widget. The system generates a first random quantum key using a first random measurement basis; transmits over a fiber optic network, a first random quantum key to a device, encrypts a logon widget instruction set using the first random quantum key and a first encryption algorithm, resulting in an encrypted message. The system then transmits the encrypted message, and the device receives a second random quantum key from the system, and measures the second random quantum key using a second random measurement basis, where the second random measurement basis is compared to the first random measurement basis, resulting in a comparison basis result. The system uses the comparison basis result to determine a level of anomalies present in the second random quantum key and a shared key, and, based on the level of anomalies, determines whether to render a logon widget at the device.

11 Claims, 6 Drawing Sheets

(56) References Cited

U.S. PATENT DOCUMENTS

| | | | |
|---|---|---|---|
| 8,897,449 | B1 | 11/2014 | Broadbent |
| 9,246,675 | B2 | 1/2016 | Ding |
| 9,537,660 | B2 | 1/2017 | Wang et al. |
| 2004/0139000 | A1 | 7/2004 | Amos |
| 2006/0088157 | A1 | 4/2006 | Fujii |
| 2006/0251247 | A1 | 11/2006 | Akiyama et al. |
| 2013/0101121 | A1* | 4/2013 | Nordholt ............... H04L 9/0852 380/279 |
| 2014/0344930 | A1* | 11/2014 | Foley ................. H04L 63/1425 726/23 |
| 2016/0149700 | A1* | 5/2016 | Fu ....................... H04L 9/0852 380/278 |

FOREIGN PATENT DOCUMENTS

| | | |
|---|---|---|
| CN | 101867474 | 10/2010 |
| CN | 102025491 | 4/2011 |
| CN | 102664732 | 9/2012 |
| CN | 103200000 | 7/2013 |
| CN | 103200001 | 7/2013 |
| CN | 103312498 | 9/2013 |
| CN | 103338448 | 10/2013 |
| EP | 2462717 | 6/2012 |
| KR | 100563907 | 3/2006 |

OTHER PUBLICATIONS

Vishnu Kumar; Quantum Computing: Quantum Key Distribution, IOSR Journal of Computer Engineering (IOSR-JCE); vol. 16, Issue 2, Ver. X11 (Mar.-Apr. 2014), pp. 122-125.

Eleni Diamanti et al., Practical Challenges in Quantum Key Distribution, Nature Partner Journals Quantum Information, published online Nov. 8, 2016, published in partnership with The University of New South Wales, 12 pages.

* cited by examiner

QUANTUM KEY DISTRIBUTION LOGON WIDGET

FIELD OF THE INVENTION

The present invention embraces a system for implementing a quantum key distribution (QKD)-secured logon widget.

BACKGROUND

Traditional encryption keys may be susceptible to eavesdropping. Due to this potential exposure, it is often difficult to provide secure authentication services for online applications. As such, a need exists for a more secure way to provide authentication services.

SUMMARY

In one aspect, the present invention embraces a computerized system, and an associated method and computer program product, for implementing a QKD-secured logon widget.

According to embodiments of the invention, a computer system comprises a computer apparatus having a processor; a memory; and a key generation application that is stored in the memory and executable by the processor. The key generation application is configured for A computer system for implementing a quantum key distribution (QKD)-secured logon widget, wherein a presence of an eavesdropping third party may be detected by comparison of quantum data corresponding to a first random quantum key sent from the computer system to a requesting device and quantum data corresponding to a second random quantum key sent from the requesting device to the computer system. The computer system includes a processor; a memory; and a key management application that is stored in the memory and executable by the processor, the key management application is configured for receiving a request for authentication from a requesting device; in response, generating a first random quantum key using a first random measurement basis; transmitting, over a fiber optic network, the first random quantum key to the requesting device, encrypting a logon widget instruction set using the first random quantum key and a first encryption algorithm, resulting in an encrypted message; transmitting, over a communications network, the encrypted message. The requesting device is configured to receive a second random quantum key from the computer system, wherein the second random quantum key will be substantially similar to the first random quantum key absent an eavesdropping measurement; measure the second random quantum key using a second random measurement basis; where the second random measurement basis is compared to the first random measurement basis, resulting in a comparison basis result. The key management application is further configured for using the comparison basis result to determine a level of anomalies present in the second random quantum key; based on the level of anomalies present in the second random quantum key, determining whether to render a logon widget at the requesting device, the rendering comprising instructing the requesting device to decrypt the encrypted message using the shared key; and render the logon widget using the logon widget instruction set.

In some embodiments, the key management application is further for determining that the level of anomalies present in the second random quantum key surpasses a predetermined anomalies threshold, thereby indicating a presence of an eavesdropping third party; and, in response, taking action to prevent the requesting device rendering the logon widget. In some such embodiments, taking action to prevent the requesting device rendering the logon widget comprises transmitting instructions to the requesting device configured to cause the requesting device to ignore the encrypted message.

In other such embodiments, taking action to prevent the requesting device rendering the logon widget comprises transmitting instructions to the requesting device configured to cause the requesting device to remove the encrypted message from the requesting device without decrypting the encrypted message.

In other such embodiments, the key management application is further for transmitting an eavesdropping notification message to an administrator of the computer system.

In yet other such embodiments, the key management application is further for in response to the indication of the presence of an eavesdropping third party, taking preemptive action regarding at least one present authentication process. In some of these embodiments, taking the preemptive action comprises transmitting a mitigation instruction to at least one additional requesting device, wherein the mitigation instruction is configured to cause the at least one additional requesting device to perform at least one action for mitigating a potential security exposure. In some such embodiments, the mitigation instruction comprises instructions configured to cause the at least one additional requesting device to prevent rendering of all logon widgets.

In some embodiments, the key management application is further for determining that the level of anomalies present in the second random quantum key does not surpass a predetermined anomalies threshold, thereby indicating an absence of an eavesdropping third party; encrypting the logon widget instruction set using the shared key and a first encryption algorithm, resulting in an encrypted message; transmitting, over a communications network, the encrypted message; and transmitting instructions to the requesting device to cause the requesting device to decrypt the encrypted message using the shared key, and render the logon widget using the logon widget instruction set.

According to embodiments of the invention, a computer program product for implementing a quantum key distribution (QKD)-secured logon widget, where a presence of an eavesdropping third party may be detected by comparison of quantum data corresponding to a first random quantum key sent from the computer system to a requesting device and quantum data corresponding to a second random quantum key sent from the requesting device to the computer system includes at least one non-transitory computer readable medium having computer-readable program code portions embodied therein. The computer-readable program code portions comprise an executable portion configured for receiving a request for authentication from a requesting device; an executable portion configured for, in response, generating a first random quantum key using a first random measurement basis; an executable portion configured for, transmitting, over a fiber optic network, the first random quantum key to the requesting device, an executable portion configured for, encrypting a logon widget instruction set using the first random quantum key and a first encryption algorithm, resulting in an encrypted message; an executable portion configured for, transmitting, over a communications network, the encrypted message; an executable portion configured for receiving a second random quantum key from a computer system, where the second random quantum key will be substantially similar to the first random quantum key absent an eavesdropping measurement; an executable portion configured for measuring the second random quantum key using a second random measurement basis, where the second random measurement basis is compared to the first random measurement basis, resulting in a comparison basis result; an executable portion configured for using the comparison basis result to determine a level of anomalies present in the second random quantum key; an executable portion configured for, based on the level of anomalies present in the second random quantum key, determining whether to render a logon widget at the requesting device. The rendering includes instructing the requesting device to decrypt the encrypted message using the shared key; and render the logon widget using the logon widget instruction set.

In some embodiments, the program code portions further comprise an executable portion configured for determining that the level of anomalies present in the second random quantum key surpasses a predetermined anomalies threshold, thereby indicating a presence of an eavesdropping third party; and an executable portion configured for, in response, taking action to prevent the requesting device rendering the logon widget.

In some such embodiments, taking action to prevent the requesting device rendering the logon widget comprises transmitting instructions to the requesting device configured to cause the requesting device to ignore the encrypted message.

In some such embodiments, taking action to prevent the requesting device rendering the logon widget comprises transmitting instructions to the requesting device configured to cause the requesting device to remove the encrypted message from the requesting device without decrypting the encrypted message.

In some such embodiments, the program code portions further comprise an executable portion configured for transmitting an eavesdropping notification message to an administrator of the computer system.

In some such embodiments, the program code portions further comprise an executable portion configured for, in response to the indication of the presence of an eavesdropping third party, taking preemptive action regarding at least one present authentication process. In some such embodiments, taking the preemptive action comprises transmitting a mitigation instruction to at least one additional requesting device, wherein the mitigation instruction is configured to cause the at least one additional requesting device to perform at least one action for mitigating a potential security exposure. In some of these embodiments, the mitigation instruction comprises instructions configured to cause the at least one additional requesting device to prevent rendering of all logon widgets.

In some embodiments, the program code portions further comprise an executable portion configured for determining that the level of anomalies present in the second random quantum key does not surpass a predetermined anomalies threshold, thereby indicating an absence of an eavesdropping third party; and an executable portion configured for encrypting the logon widget instruction set using the shared key and a first encryption algorithm, resulting in an encrypted message; an executable portion configured for transmitting, over a communications network, the encrypted message; and an executable portion configured for transmitting instructions to the requesting device to cause the requesting device to decrypt the encrypted message using the shared key, and render the logon widget using the logon widget instruction set.

According to embodiments of the invention, a computer-implemented method for implementing a quantum key distribution (QKD)-secured logon widget, where a presence of an eavesdropping third party may be detected by comparison of quantum data corresponding to a first random quantum key sent from the computer system to a requesting device and quantum data corresponding to a second random quantum key sent from the requesting device to a computer system. The method includes receiving, by a computer system, a request for authentication from a requesting device; in response, generating, by the computer system, a first random quantum key using a first random measurement basis; transmitting, by the computer system, over a fiber optic network, the first random quantum key to the requesting device, encrypting, by the computer system, a logon widget instruction set using the first random quantum key and a first encryption algorithm, resulting in an encrypted message; transmitting, by the computer system, over a communications network, the encrypted message; receiving, by a requesting device, a second random quantum key from the computer system, wherein the second random quantum key will be substantially similar to the first random quantum key absent an eavesdropping measurement; measuring, by the requesting device, the second random quantum key using a second random measurement basis; where the second random measurement basis is compared to the first random measurement basis, resulting in a comparison basis result; using, by the computer system, the comparison basis result to determine a level of anomalies present in the second random quantum key; based on the level of anomalies present in the second random quantum key, determining, by the computer system, whether to render a logon widget at the requesting device, the rendering comprising instructing the requesting device to decrypt the encrypted message using the shared key; and render the logon widget using the logon widget instruction set.

In some embodiments, the method includes determining, by the computer system, that the level of anomalies present in the second random quantum key surpasses a predetermined anomalies threshold, thereby indicating a presence of an eavesdropping third party; and, in response, taking action, by the computer system, to prevent the requesting device rendering the logon widget.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
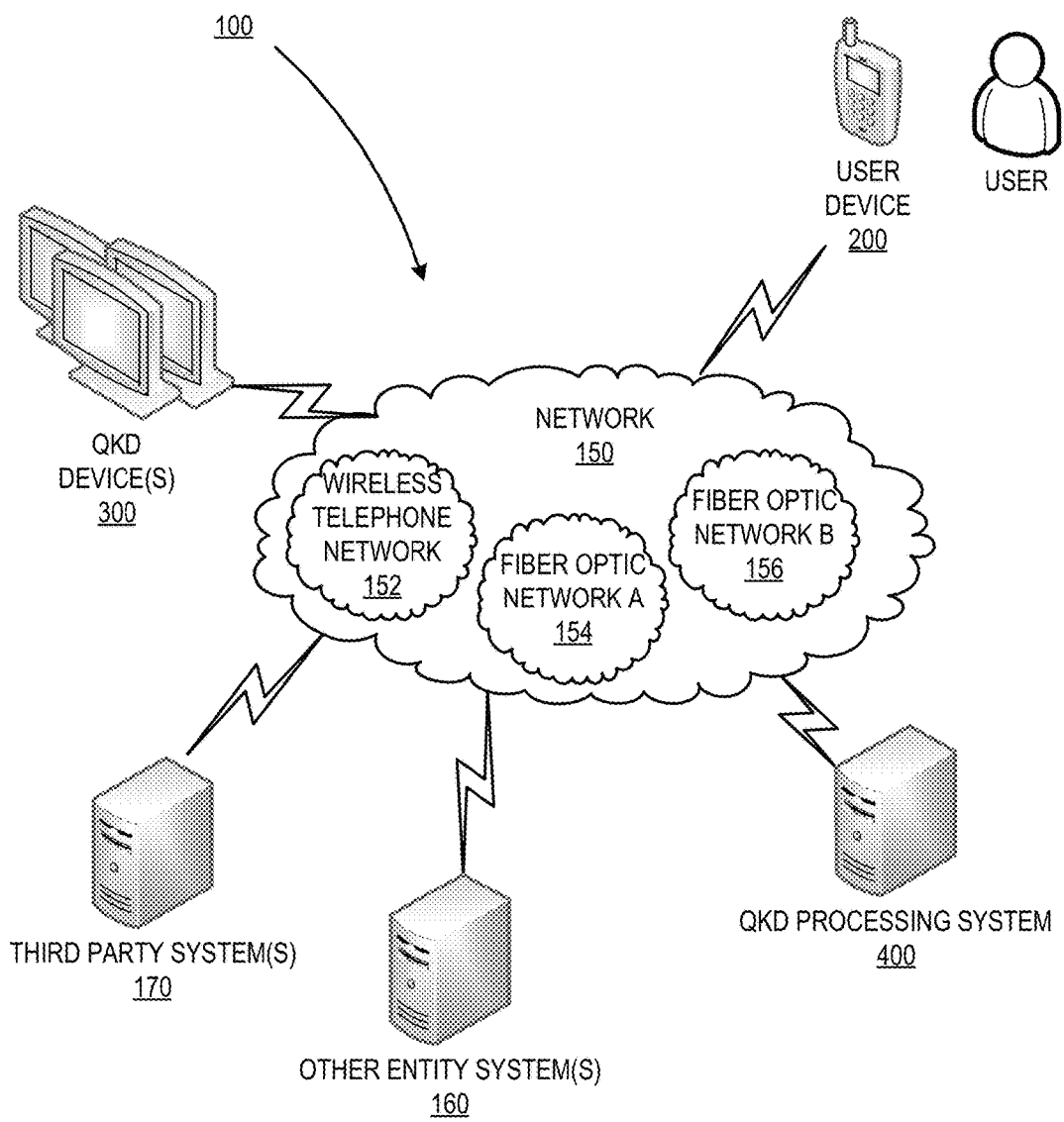
Figure 2:
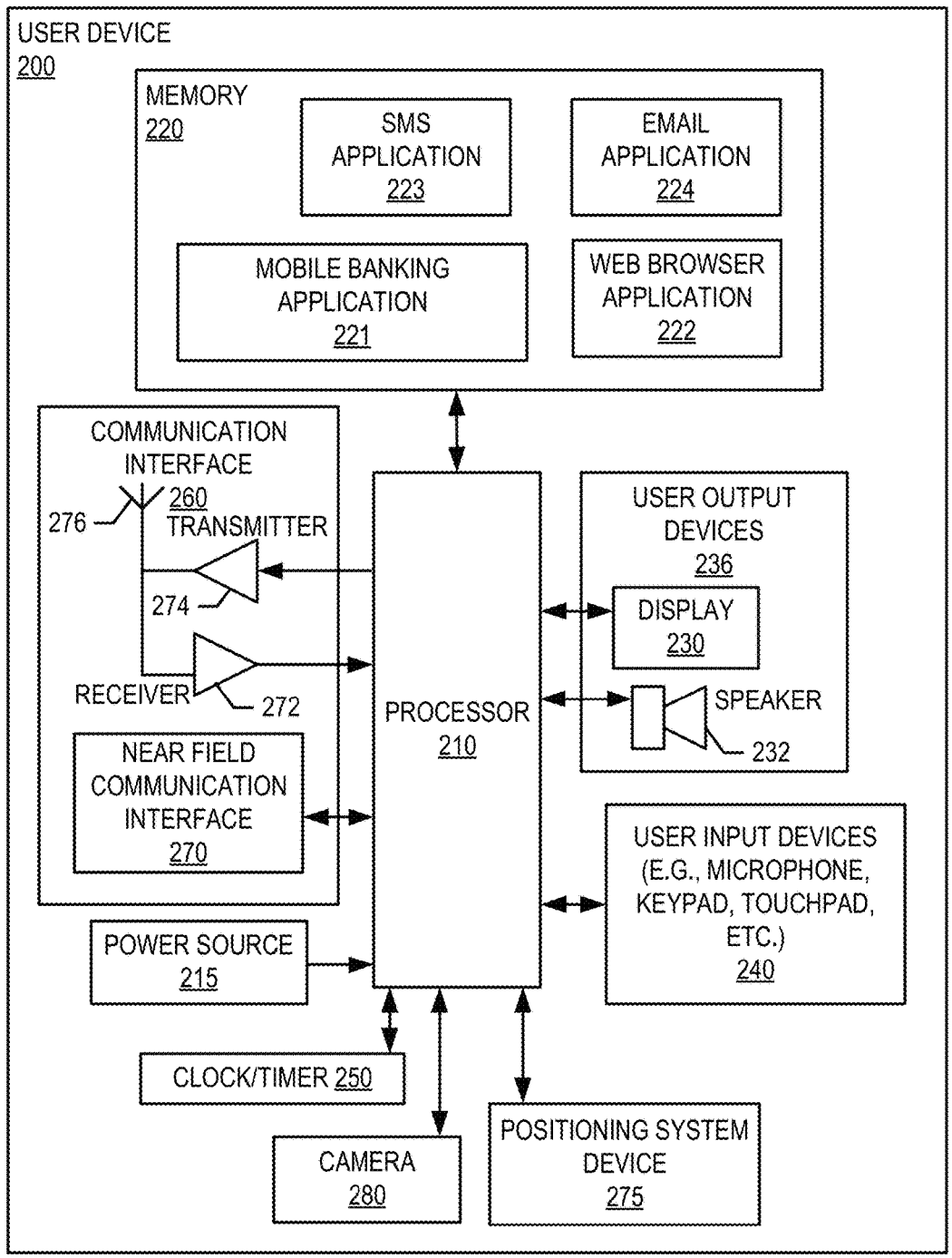
Figure 3:
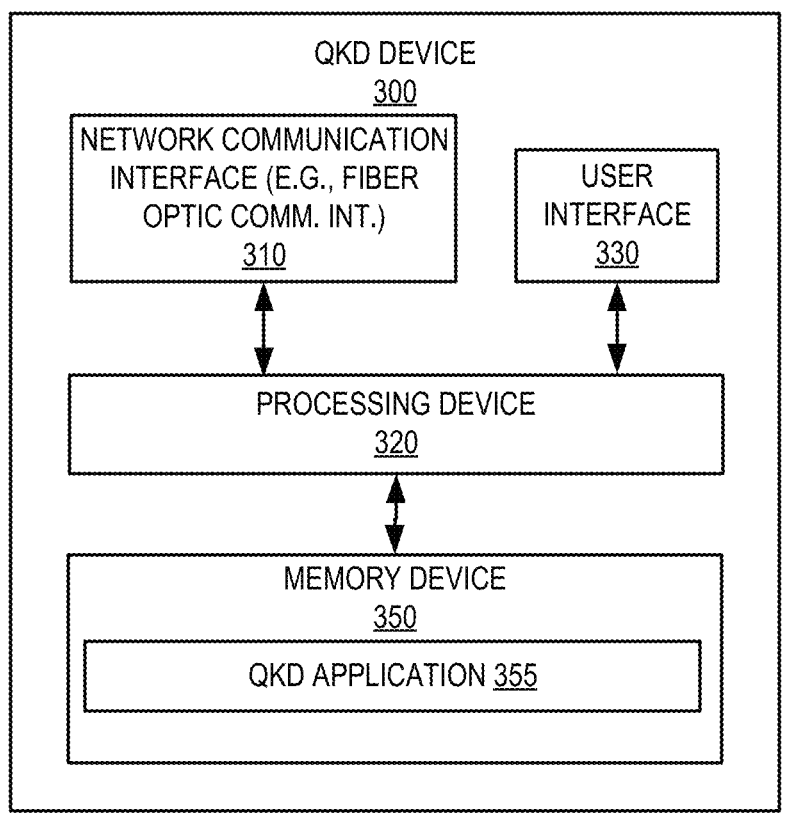
Figure 4:
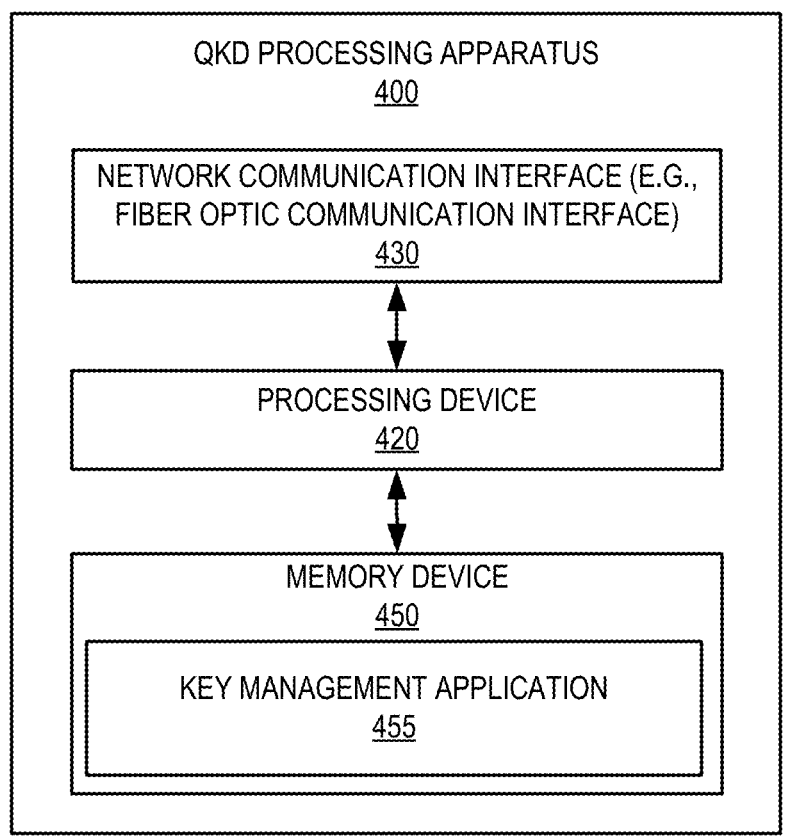
Figure 5A:
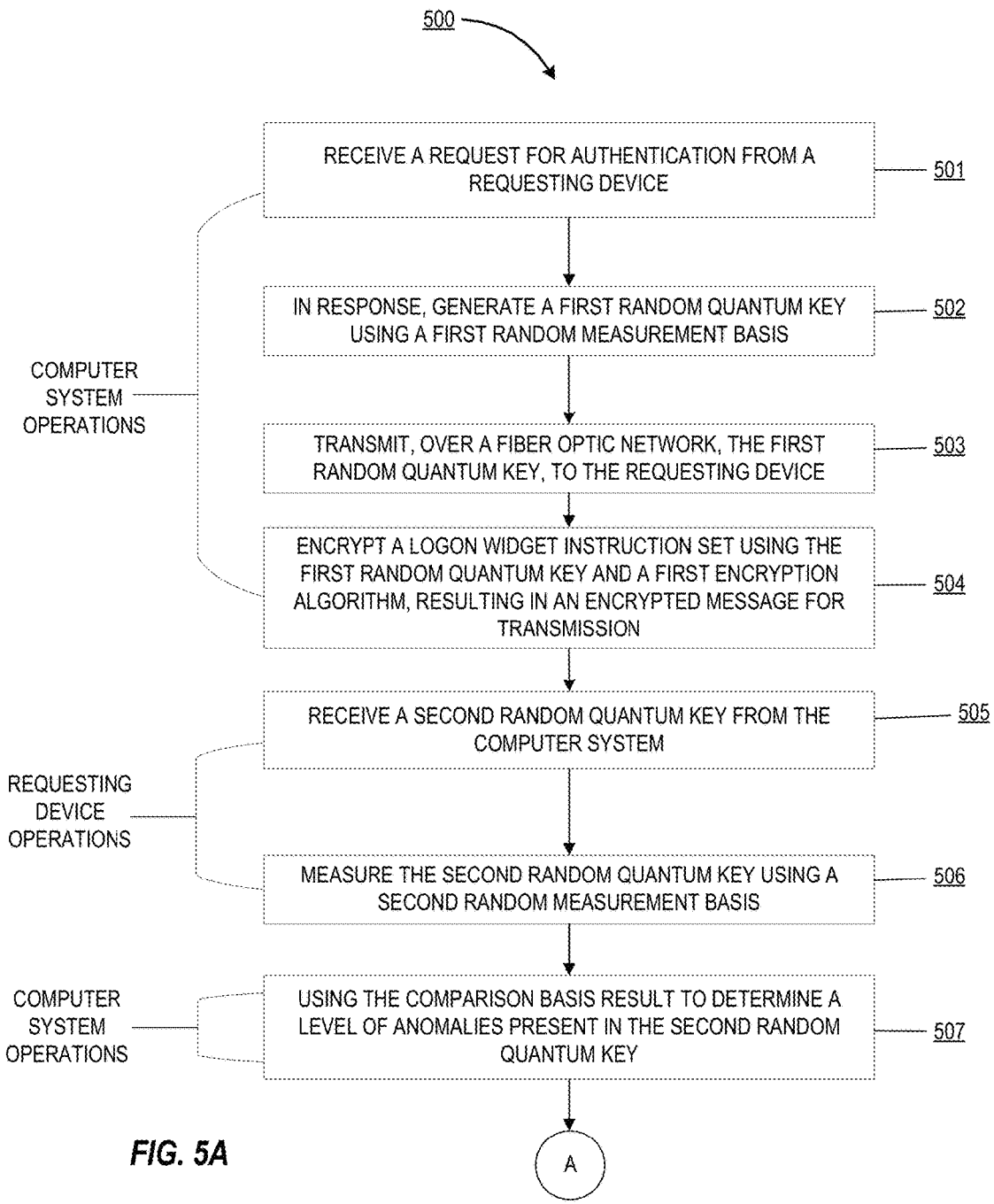
Figure 5B:
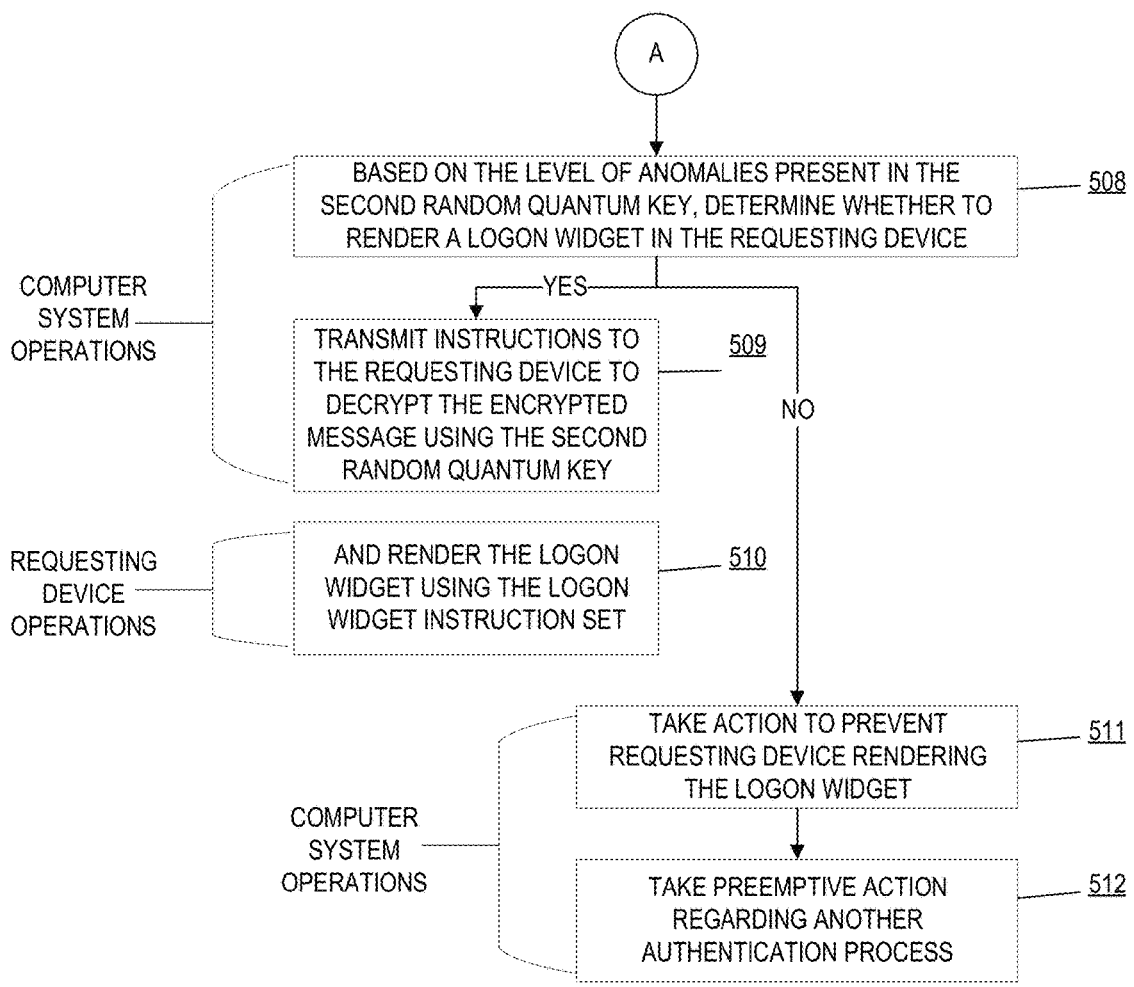

Having thus described embodiments of the invention in general terms, reference will now be made the accompanying drawings, wherein:

FIG. 1 depicts an operating environment in accordance with an aspect of the present invention;

FIG. 2 schematically depicts a user device in accordance with an aspect of the present invention;

FIG. 3 schematically depicts a QKD receiving device in accordance with an aspect of the present invention;

FIG. 4 schematically depicts a QKD processing apparatus in accordance with an aspect of the present invention; and FIGS. 5A-5B depict a method for implementing a quantum key distribution (QKD)-secured logon widget.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be any institution employing information technology resources and particularly technology infrastructure configured for large scale processing of media information in order to indicate potential pricing movement. As such, the entity may be any institution, group, association, financial institution, establishment, company, union, authority or the like, employing information technology resources for the processing of media information to indicate potential pricing movement.

As described herein, a "user" may be an individual associated with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer. In other embodiments, a user may be a party (e.g., an individual or organization) sending, receiving, or otherwise involved with media information analysis and indications of potential pricing movement.

As discussed above, embodiments of the present invention embraces a system that implements a QKD-secured logon widget. The presence of an eavesdropping third party may be detected by comparison of (i) quantum data corresponding to a first random quantum key sent from the computer system to a requesting device and (ii) quantum data corresponding to a second random quantum key sent from the requesting device to the computer system. The system generates a first random quantum key using a first random measurement basis; transmits over a fiber optic network, a first random quantum key to a device, encrypts a logon widget instruction set using the first random quantum key and a first encryption algorithm, resulting in an encrypted message. The system then transmits the encrypted message, and the device receives a second random quantum key from the system, and measures the second random quantum key using a second random measurement basis, where the second random measurement basis is compared to the first random measurement basis, resulting in a comparison basis result. The system uses the comparison basis result to determine a level of anomalies present in the second random quantum key, and, based thereon, determines whether to render a logon widget at the device.

A brief discussion of quantum computers may be helpful in understanding quantum data transmission as discussed herein. As used herein, a quantum computer is any computer that utilizes the principles of quantum physics to perform computational operations. Several variations of quantum computer design are known, including photonic quantum computing, superconducting quantum computing, nuclear magnetic resonance quantum computing, and/or ion-trap quantum computing. Regardless of the particular type of quantum computer implementation, all quantum computers encode data onto qubits. Whereas classical computers encode bits into ones and zeros, quantum computers encode data by placing a qubit into one of two identifiable quantum states. Unlike conventional bits, however, qubits exhibit quantum behavior, allowing the quantum computer to process a vast number of calculations simultaneously. Similarly, data may be communicated using qubits and the quantum properties of light, such as by laser or over fiber optic networks.

A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits when data is communicated based on quantum properties or in a quantum computer: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously. Further, these two principles each individually form the basis for various types and theories of quantum data transmission.

In a quantum computer with n qubits, the quantum computer can be in a superposition of up to 2n states simultaneously. By comparison, a classical computer can only be in one of the 2n states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three qubit system can store the information of eight classical bits, four qubits can store the information of sixteen classical bits, and so on. A quantum computer with three hundred qubits could possess the processing power equivalent to the number of atoms in the known universe.

Quantum Key Distribution

Quantum Key Distribution (QKD) uses quantum mechanics to guarantee secure communication. A secret key may be generated and distributed, whereby the secret key is used to encrypt and decrypt messages. QKD allows the participating parties to detect any third party attempt to access the key because an attempt to measure a quantum system necessarily disturbs the system, thereby altering the secret key, or in other words, measuring the key introduces detectable anomalies in the key. QKD uses quantum super-positions and/or quantum entanglement to transmit information in quantum states. Generally speaking, once a secret key is generated and distributed from a sending system to a receiving system, communication between the sending system and receiving system may be secured by the receiving system identifying eavesdropping of the secret key by detecting any anomalies within the key.

QKD relies on quantum mechanics, whereas traditional key encryption protocols rely on computational difficulty of certain mathematical functions, and therefore, cannot offer an indication of eavesdropping or guarantee that a key is secure. QKD is used to produce and distribute a key. The key is then used, in conjunction with a selected encryption algorithm to encrypt and decrypt a message. A message encrypted with the key can then be transmitted over a standard communication protocol channel. A common encryption algorithm used in association with QKD is the one-time pad, as it is widely accepted as a secure algorithm provided a secret, random key is assured.

QKD Logon Widget

Referring now to FIG. 1, a block diagram illustrates an operating environment 100, in accordance with an embodiment of the present invention. As illustrated in FIG. 1, the operating environment 100 typically includes a user device 200, one or more QKD devices 300, and a QKD processing system 400. The QKD processing system 400 is typically maintained by an entity (e.g., government, university, financial institution, etc.) that requires a strong security level for authentication of remote users. The user device 200 and/or QKD device 300 may be configured to request authentication of users when users desire access to secure content (e.g., when a financial institution customer desires access to online banking). Such requests may be communicated over the network 150 to the QKD processing system 400 or other entity system(s) 160 for processing as discussed herein. The network 150 may include a local area network (LAN), a wide area network (WAN), and/or a global area network (GAN). The network 150 may provide for wireline, wireless, optical (free space or fiber optic) or any combination of the foregoing between devices in the network. In one embodiment, the network 150 includes the Internet. In one embodiment, the network 150 includes a wireless telephone network 152. In some embodiments, the network 150 includes one or more fiber optic networks, such as fiber optic network A 154 and fiber optic network B 156. The QKD processing system 400 may also be in network communication with other devices, such as other entity systems 160 and/or third party systems 170, which may also process data to create quantum data transmissions, random quantum keys or encrypt or decrypt communications as discussed herein.

FIG. 2 provides a block diagram illustrating the user device 200 of FIG. 1 in more detail, in accordance with embodiments of the invention. In some embodiments, the user device 200 is a mobile device, such as mobile telephone. However, it should be understood, however, that a mobile telephone is merely illustrative of one type of mobile device that may benefit from, employ, or otherwise be involved with embodiments of the present invention and, therefore, should not be taken to limit the scope of embodiments of the present invention. Other types of mobile devices may include portable digital assistants (PDAs), pagers, mobile televisions, gaming devices, laptop computers, cameras, video recorders, audio/video player, radio, GPS devices, or any combination of the aforementioned. In addition, the user device 200 may be a computing device that is not a mobile device, such as a desktop computer or workstation.

The user device 200 typically includes a processor 210 communicably coupled to such devices as a memory 220, user output devices 236, user input devices 240, a communication interface 260, a power source 215, a clock or other timer 250, a camera 280, and a positioning system device 275. The processor 210, and other processors described herein, typically includes circuitry for implementing communication and/or logic functions of the user device 200. For example, the processor 210 may include a digital signal processor device, a microprocessor device, and various analog to digital converters, digital to analog converters, and/or other support circuits. Control and signal processing functions of the user device 200 are allocated between these devices according to their respective capabilities. The processor 210 thus may also include the functionality to encode and interleave messages and data prior to modulation and transmission. The processor 210 can additionally include an internal data modem. Further, the processor 210 may include functionality to operate one or more software programs, which may be stored in the memory 220. For example, the processor 210 may be capable of operating a connectivity program, such as a web browser application 222. The web browser application 222 may then allow the user device 200 to transmit and receive web content, such as, for example, location-based content and/or other web page content, according to a Wireless Application Protocol (WAP), Hypertext Transfer Protocol (HTTP), and/or the like.

The processor 210 is typically configured to use the communication interface 260 to communicate with one or more other devices on the network 150. In this regard, the communication interface 260 typically includes an antenna 276 operatively coupled to a transmitter 274 and a receiver 272 (together a "transceiver"). The processor 210 is typically configured to provide signals to and receive signals from the transmitter 274 and receiver 272, respectively. The signals may include signaling information in accordance with the air interface standard of the applicable cellular system of the wireless telephone network 152. In this regard, the user device 200 may be configured to operate with one or more air interface standards, communication protocols, modulation types, and access types. By way of illustration, the user device 200 may be configured to operate in accordance with any of a number of first, second, third, and/or fourth-generation communication protocols and/or the like. For example, the user device 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 200 may also be configured to operate in accordance with non-cellular communication mechanisms, such as via a wireless local area network (WLAN) or other communication/data networks.

The communication interface 260 may also include a near field communication (NFC) interface 270. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface 270 may include a smart card, key card, proximity card, Bluetooth® device, radio frequency identification (RFID) tag and/or reader, transmitter, receiver, and/or the like. In some embodiments, the NFC interface 270 communicates information via radio, infrared (IR), and/or optical transmissions.

In some embodiments, the NFC interface 270 is configured to operate as an NFC transmitter and/or as an NFC receiver (e.g., an NFC reader). Also, it will be understood that the NFC interface 270 may be embedded, built, carried, and/or otherwise supported in and/or on the user device 200. In some embodiments, the NFC interface 270 is not supported in and/or on the user device 200, but the NFC interface 270 is otherwise operatively connected to the user device 200 (e.g., where the NFC interface 270 is a peripheral device plugged into the user device 200). Other apparatuses having NFC interfaces mentioned herein may be configured similarly. In some embodiments, the NFC interface 270 of the user device 200 is configured to contactlessly and/or wirelessly communicate information to and/or from a corresponding NFC interface of another apparatus (e.g., another mobile or computing device).

The user device 200 typically has a user interface that is, like other user interfaces described herein, made up of user output devices 236 and/or user input devices 240. The user output devices 236 include a display 230 (e.g., a liquid crystal display or the like) and a speaker 232 or other audio device, which are operatively coupled to the processor 210. The user input devices 240, which allow the user device 200 to receive data from a user, may include any of a number of devices allowing the user device 200 to receive data from a user, such as a keypad, keyboard, touch-screen, touchpad, microphone, mouse, joystick, other pointer device, button, soft key, and/or other input device(s). The user interface may also include a camera 280, such as a digital camera.

The user device 200 may also include a positioning system device 275 that is configured to be used by a positioning system to determine a location of the user device 200. For example, the positioning system device 275 may include a global positioning system (GPS) transceiver. In some embodiments, the positioning system device 275 is at least partially made up of the antenna 276, transmitter 274, and receiver 272 described above. For example, in one embodiment, triangulation of cellular signals may be used to identify the approximate location of the user device 200. In other embodiments, the positioning system device 275 includes a proximity sensor or transmitter, such as an RFID tag, that can sense or be sensed by devices known to be located proximate a location to determine that the user device 200 is located proximate these known devices.

The user device 200 further includes a power source 215, such as a battery, for powering various circuits and other devices that are used to operate the user device 200. Embodiments of the user device 200 may also include a clock or other timer 250 configured to determine and, in some cases, communicate actual or relative time to the processor 210 or one or more other devices.

The user device 200 also includes a memory 220 operatively coupled to the processor 210. As used herein, memory includes any computer readable medium (as defined herein below) configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory can additionally or alternatively include an electrically erasable programmable read-only memory (EEPROM), flash memory or the like.

The memory 220 can store any of a number of applications within or associated with the user device 200 (e.g., a computer, and the like) described herein. For example, the memory 220 may include such applications as a conventional web browser application 222 and/or a mobile banking application 221. These applications also typically provide a graphical user interface (GUI) on the display 230 that allows the user to communicate with the user device 200, the QKD processing system 400, and/or other devices or systems. In one embodiment of the invention, when the user decides to enroll in an online banking program, the user downloads or otherwise obtains the mobile banking system client application from an entity system (e.g., an application server), which may require user authentication at download, installation, and/or operation of the mobile banking system client application. Such authentication may be provided in accordance with embodiments of the invention discussed herein.

In other embodiments of the invention, the user interacts with the QKD processing system 400 via the web browser application 222 in addition to, or instead of, the mobile banking application 221 for secure authentication. The user of the user device 200 may use the web browser application 222 and/or the mobile banking application 221 to administer one or more of the processes discussed herein such as managing which media information will be collected and sent to the QKD processing system 400 and/or setting one or more threshold levels for making determinations such as whether a certain level of anomalies are present in a received random quantum key as discussed herein.

The memory 220 can also store any of a number of pieces of information, and data, used by the user device 200 and the applications and devices that make up the user device 200 or are in communication with the user device 200 to implement the functions of the user device 200 and/or the other systems described herein. For example, the memory 220 may include such data as user authentication information, keys such as received random quantum keys, encrypted messages waiting for decryption while a random quantum key is received and verified and the like. As discussed herein, "verification" of a quantum key refers to the processes discussed herein whereby a quantum key is determined to be secure or not secure, that is, whether or not a third party eavesdropper has accessed the quantum key during transmission or storing of the quantum key.

The QKD device 300 is typically a network device, such as a device within any network that may require access to secure information and must authenticate a user by the methods discussed herein. In some examples, the QKD device 300 is a user device or vice versa and the QKD device 300 is sometimes referred to herein as a "requesting device" due to its request of access to secure content or request for authentication or a "receiving device" due to its receiving of a transmitted random quantum key from the QKD processing system 400.

Referring now to FIG. 3, the QKD device 300 includes various features, such as a network communication interface 310, a processing device 320, a user interface 330, and a memory device 350. The network communication interface 310 includes a device that allows the QKD device 300 to communicate over the network 150 (shown in FIG. 1).

The network communication interface 310 may include one or more an optical communication transceivers, transmitters, emitters, or receivers. For example, the network communication interface 310 may include a fiber optic communication interface configured to transmit data, such as data related to a quantum data (e.g., a random quantum key) received from the QKD processing system 400, over a fiber optic communication channel. Similarly, the network communication interface 310 may also be or include a free space optical communication interface having a laser for optical communication over free space. In some embodiments, the network communication interface includes multiple interfaces for interfacing with multiple networks. For example, receipt of a random quantum key may be performed over a dedicated fiber optic channel interfaced with the network communication interface 310, and communication of encrypted messages or other data may be performed over a different communication channel, such as a traditional network channel or separate fiber optic channel interfaced with the network communication interface 310.

In one embodiment of the invention, a QKD application 355 may communicate with other devices and/or applications discussed herein in order to receive data to be encoded and/or encrypted, to receive random quantum keys and verify them along with the QKD processing system 400, and/or other keys for use in encryption algorithms and to transmit and/or receive communications including transmission or messages and/or keys. The QKD application 355 may run on the QKD device 300 so that it may interact with various other devices/system to facilitate secure transmission of random quantum keys, encrypted messages and/or authentication widget rendering instructions or credentials.

In some embodiments, the QKD device 300 may include a contactless interface. In one embodiment, the contactless interface is an NFC interface. The contactless interface may be configured to contactlessly and/or wirelessly send and/or receive information over relatively short ranges (e.g., within four inches, within three feet, etc.). The contactless interface may include a transmitter, receiver, smart card, key card, proximity card, Bluetooth® device, radio frequency identification (RFID) tag and/or reader, and/or the like. In some embodiments, the contactless interface communicates information via radio, IR, and/or optical transmissions. Generally, the contactless interface is configured to operate as a contactless transmitter and/or as a contactless receiver. The contactless interface functions to facilitate information transactions with users utilizing an external apparatus, for example, the user device 200, capable of contactless communication. Also, it will be understood that the contactless interface may be embedded, built, carried, and/or otherwise supported in and/or on the QKD device 300. In some embodiments, the contactless interface is not supported in and/or on the QKD device 300, but is otherwise operatively connected to the QKD device 300 (e.g., where the contactless interface is a peripheral device plugged into the QKD device 300). The contactless interface of the QKD device 300 may be configured to contactlessly and/or wirelessly communicate information to and/or from an external apparatus (e.g., the user device 200 or the QKD processing system 400).

The QKD device 300, may further include one or more additional devices to help execute one or more of the steps and/or processes discussed herein. In some embodiments the QKD device 300 is configured to authenticate data transmissions from originating network devices by establishing an operative communication channel with the QKD processing system 400. For instance, the QKD device 300 may transmit signal(s) with encoded data specific to the QKD processing system 400 that other devices cannot recognize and/or decode. The QKD processing system 400 may receive the encoded data and a specific decoding module of the QKD processing system 400 may decode the signal and transmit an augmented signal to a receiver on the QKD processing system 400. The augmented signal may include the decoded signal along with a token identifier of the QKD processing system 400, one or more user parameters (such as authentication credentials, or indication of a successful validation of credentials received at the QKD processing system 400, such as the user's fingerprint or passcode) and the like. The QKD device (optionally in conjunction with another system), may then analyze the augmented signal and authenticate the data transmission based on authenticating the QKD processing system 400, and allow the transmission to proceed.

In some embodiments, this operative communication channel is used for secure transfer of quantum keys and messages encrypted thereby. As discussed herein, the integrity of the quantum keys may be verified prior to decryption of the transmitted messages by interactions between the QKD device 300 and the QKD processing system 400.

FIG. 4 depicts the QKD processing system 400 in more detail. The QKD processing system 400 may, in some embodiments, serve as a central processing system or "hub" in a "hub and spoke" arrangement where multiple QKD devices 300 are the "spokes". As noted, the QKD processing system 400 may be a device that functions as a processing center for one or more of the steps and/or processes discussed herein. For example, the QKD processing system 400 may be or include a computer having a network communication interface 430, a processing device 420, and a memory device 450. The network communication interface 430 may include one or more an optical communication transceivers, transmitters, emitters, or receivers. For example, the network communication interface 430 may include a fiber optic communication interface configured to transmit data, such as quantum data (e.g., a random quantum key) over a fiber optic communication channel. Similarly, the network communication interface may also be or include a free space optical communication interface having a laser for optical communication over free space. In some embodiments, the network communication interface includes multiple interfaces for interfacing with multiple networks. For example, communication of a random quantum key may be performed over a dedicated fiber optic channel interfaced with the network communication interface 430, and communication of encrypted messages or other data may be performed over a different communication channel, such as a traditional network channel or separate fiber optic channel interfaced with the network communication interface 430.

The QKD processing system 400 also typically includes a key management application 455 that is configured to perform various aspects of processing such as generating a random quantum key and coordinating verification of the random quantum key with a QKD device, as discussed herein.

As discussed elsewhere herein, embodiments of the present invention embraces a system that implements a QKD-secured logon widget. The presence of an eavesdropping third party may be detected by comparison of (i) quantum data corresponding to a first random quantum key sent from the computer system to a requesting device and (ii) quantum data corresponding to a second random quantum key sent from the requesting device to the computer system. The system generates a first random quantum key using a first random measurement basis; transmits over a fiber optic network, a first random quantum key to a device, encrypts a logon widget instruction set using the first random quantum key and a first encryption algorithm, resulting in an encrypted message. The system then transmits the encrypted message, and the device receives a second random quantum key from the system, and measures the second random quantum key using a second random measurement basis, where the second random measurement basis is compared to the first random measurement basis, resulting in a comparison basis result. The system uses the comparison basis result to determine a level of anomalies present in the second random quantum key, and, based thereon, determines whether to render a logon widget at the device.

Referring now to FIGS. 5A-5B, a method 500 is provided for implementing a QKD-secured logon widget for accessing sensitive areas. First, as represented by block 501, a computer system (such as the QKD processing system 400) receives a request for authentication from a requesting device (such as the QKD device 300). This request may be a result of a user expressing a desire to access secured content such as an online banking session or a mobile application banking session. Next, as represented by block 502, the computer system may, in response to the request, generate a first random quantum key using a first random measurement basis.

Generation of a random quantum key may be based on either type (i)—"prepare and measure protocols"—or type (ii)—entanglement based protocols. Prepare and measure protocols rely on the principle that measurement is an integral part of quantum mechanics. In general, measuring an unknown quantum state changes that state in some way. This is known as quantum indeterminacy and underlies results such as the Heisenberg uncertainty principle, information-disturbance theorem and no cloning theorem. This can be used in order to detect any eavesdropping on communication (which necessarily involves measurement) and to calculate the amount of information that has been intercepted. Regarding entanglement based protocols, the quantum states of two (or more) separate objects can become linked together in such a way that they must be described by a combined quantum state, not as individual objects. As discussed above, this is known as entanglement and means that, for example, performing a measurement on one object affects the other. If an entangled pair of objects is shared between two parties, anyone intercepting either object alters the overall system, revealing the presence of the third party (and the amount of information they have gained). There are at least three different families of protocols within the above two types including discrete variable, continuous variable and distributed phase reference coding. The discrete variable protocols are the most widely discussed and implemented and the embodiments discussed herein focus primarily on discrete variable protocols such as the BB84 protocol and the E91 protocol, but the scope of the invention is not necessarily limited to discrete variable protocols.

Block 502 may include determining a set of random bits for the key and then determining, for each bit, a randomly selected basis for transmission. The bases may be, for example, rectilinear and diagonal. Then, a photon polarization state may be determined for each bit based on both the bit value and the basis. Then the photon may be transmitted over a quantum channel such as a fiber optic network with minimal or zero noise or loss, as represented by block 503. In conjunction with transmission of the quantum bits of the key, the computer system also records the basis and time of each photon transmitted for use in verification later.

Next, as represented by block 504, the computer system encrypts a logon widget instruction set using a shared key (which is the result of the verification process of the second random quantum key received by the requesting device) and a first encryption algorithm, resulting in an encrypted message for transmission. Any desired encryption algorithm may be used in conjunction with the quantum key. In some embodiments, the quantum key is transmitted over a quantum channel separate from a traditional communication channel over which the encrypted message is transmitted. In some embodiments, transmission of the quantum key is slower than transmission of the encrypted message. Typically, the quantum key must be verified in order to finalize the shared key for use in encryption of the message (and, of course, decryption of the message), so the quantum key is transmitted prior to encryption and transmission of the encrypted message. In other words, the quantum key may be generated, verified between devices resulting in the shared key, and then the shared key is used to encrypt the message. An encrypted message may then be transmitted concurrently (albeit over separate networks) as another, different quantum key (or the same quantum key being used for another purpose).

Next, the requesting device (such as a QKD device) may receive a second random quantum key from the computer system, as represented by block 505. The second random quantum key corresponds with the first random quantum key transmitted by the computer system in the step represented by block 503 and, in cases where the quantum channel of communication has zero loss and no eavesdropping third party has interfered with the transmission, the first random quantum key and the second random quantum key may be identical. In cases where a third party has eavesdropped on the transmission of the quantum key, then the eavesdropping necessarily alters the key being transmitted, and therefore, the eavesdropping may be detected.

In order to perform verification of the second random quantum key, the requesting device measures the second random quantum key using a second random measurement basis, as represented by block 506. The second random measurement basis is a measurement basis selected at random for each bit of the key. For example, the device may randomly select with the rectilinear or diagonal measurement basis. If the bit was created using the same basis as it is measured (i.e., created with rectilinear and measurement with rectilinear or created with diagonal and measured with diagonal), then the measured state is the correct state. If not, then the measurement returns a random result and causes the photon to be polarized in the state in which it was measured. Therefore, all information about the original bit's polarization is lost. The requesting device records the randomly selected measurement basis for each photon, the time and the measurement result for verification purposes.

The requesting device may then communicate with the computer system over any channel (even a public channel such as the Internet) in order to transmit the requesting device's bases for measuring each of the bits of the received quantum key. The computer system sends the requesting device its bases for creation of the first quantum key and both the computer system and the requesting device discard bits corresponding to generation basis/measurement basis pairs that do not match. The remaining bits (i.e., the bits corresponding to generation basis/measurement basis pairs that do match—e.g., rectilinear-rectilinear or diagonal-diagonal) form the shared key for use in encryption and decryption.

In order to check for an eavesdropping third party, the computer system and the requesting device may then compare a predetermined subset of the remaining bit strings (i.e., a subset of the shared key). If an eavesdropping third party has accessed any information about the photons' polarization (i.e., measured the transmitted quantum key), then such access introduces errors in the requesting device's measurements. The number of non-matching bits may be compared to a threshold level of anomalies, as shown in block 507. If the level of anomalies exceeds the threshold, then the shared keys are discarded and another attempt at key generation and transmission may be made. If the level of anomalies is below the threshold, then the shared keys may be considered verified and used for encryption/decryption of messages. In some cases, where an eavesdropping third party is detected, the next attempt at key transmission may be made over a different quantum channel. The threshold may be chosen so that the number of bits known to an eavesdropping third party is an arbitrary amount. Privacy amplification may be implemented to reduce the probability that the third party has knowledge of the key. Privacy amplification may involve producing a new, shorter key using the shared key by applying a universal hash function chosen at random from a publicly known set of such functions.

Next, the computer system determines whether the requesting device should render the logon widget based on the level of anomalies present in the second random quantum key, as represented by block 508. In some embodiments, the encrypted message has been sent and in others, the message has not yet been encrypted. If the logon widget is to be rendered, then the computer system transmits instructions to the requesting device to decrypt the encrypted message using the shared key, as represented by block 509. Then, the requesting device renders the logon widget using the logon widget instruction set, as represented by block 510. If the logon widget is not to be rendered on the requesting device, then the computer system may take action to prevent the requesting device from rendering the logon widget, as represented by block 511. In addition, in some embodiments, the computer system may take preemptive action or actions regarding other authentication processes, as represented by block 512. This may be done as a result of the knowledge of the presence of an eavesdropping third party.

In some embodiments, the determination of whether a third party eavesdropper is present may indicate not only whether the logon widget is rendered, but also whether the authentication credentials are transmitted. If the level of anomalies rises above a particular threshold, then the authentication credentials may be blocked from transmission to prevent exposure of the credentials to the third party. In some embodiments, the way the authentication credentials are transmitted may be impacted by the level of anomalies detected in the quantum key transmission.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A computer system for implementing a quantum key distribution (QKD)-secured logon widget, wherein a presence of an eavesdropping third party may be detected by comparison of quantum data corresponding to a first random quantum key sent from the computer system to a requesting device and quantum data corresponding to a second random quantum key sent from the requesting device to the computer system, the computer system comprising:
 a processor;
 a memory; and
 a key management application that is stored in the memory and executable by the processor;
 wherein the key management application is configured for:
  receiving a request for authentication from a requesting device;
  in response, generating a first random quantum key using a first random measurement basis; and
  transmit, over a fiber optic network, the first random quantum key to the requesting device,
  encrypting a logon widget instruction set using the first random quantum key and a first encryption algorithm, resulting in an encrypted message for transmission;
 wherein the requesting device is configured to:
  receive a second random quantum key from the computer system,
  measure the second random quantum key using a second random measurement basis;
 wherein the second random measurement basis is compared to the first random measurement basis, resulting in a comparison basis result and a shared key;
 and wherein the key management application is further configured to:
  use the comparison basis result to determine a level of anomalies present in the second random quantum key and thereby the shared key;
  based on the level of anomalies resent in the second random quantum key, determine whether to render a logon widget in the requesting device;
  in response to determining that the level of anomalies is below the predetermined anomalies threshold, transmit instructions to the requesting device to decrypt the encrypted message using the second random quantum key; and
  render the logon widget using the logon widget instruction set; and
  in response to determining that the level of anomalies is above the predetermined anomalies threshold, transmitting second instructions to the requesting device to remove the encrypted message without decrypting the message.

2. The computer system of claim 1, wherein the key management application is further configured for:
 transmitting an eavesdropping notification message to an administrator of the computer system.

3. The computer system of claim 1, wherein the key management application is further configured for:
 in response to the indication of eavesdropping by the third party, taking preemptive action regarding at least one present authentication process.

4. The computer system of claim 3, wherein taking the preemptive action comprises transmitting a mitigation instruction to at least one additional requesting device, wherein the mitigation instruction is configured to cause the at least one additional requesting device to perform at least one action for mitigating a potential security exposure.

5. The computer system of claim 4, wherein the mitigation instruction comprises instructions configured to cause the at least one additional requesting device to prevent rendering of all logon widgets.

6. A computer program product for implementing a quantum key distribution (QKD)-secured logon widget, wherein a presence of an eavesdropping third party may be detected by comparison of quantum data corresponding to a first random quantum key sent from the computer system to a requesting device and quantum data corresponding to a second random quantum key sent from the requesting device to the computer system, the computer program product comprising at least one non-transitory computer readable medium having computer-readable program code portions embodied therein, the computer-readable program code portions comprising:
 an executable portion configured for receiving a request for authentication from a requesting device;
 an executable portion configured for, in response, generating a first random quantum key using a first random measurement basis;
 an executable portion configured for, transmitting, over a fiber optic network, the first random quantum key to the requesting device,
 an executable portion configured for, encrypting a logon widget instruction set using the first random quantum key and a first encryption algorithm, resulting in an encrypted message for transmission;
wherein the requesting device is configured to:
 receive a second random quantum key from the computer system, wherein the received second random quantum key is identical to the first random quantum key absent eavesdropping absent eavesdropping by a third party during transmission of the second random quantum key;

measure the second random quantum key using a second random measurement basis;

wherein the second random measurement basis is compared to the first random measurement basis, resulting in a comparison basis result and a shared key; and wherein the key management application is further configured for to:

using the shared key to transmit an encrypted message to the requesting device comprising a logon widget instruction set to render a logon widget at the requesting device;

use using the comparison basis result to determine a level of anomalies present in the second random quantum key and thereby the shared key;

based on the level of anomalies resent in the second random quantum key, determine whether to render a logon widget in the requesting device;

determining that the level of anomalies present in the second random quantum key is above or below a predetermined anomalies threshold;

in response to determining that the level of anomalies is below the predetermined anomalies threshold, transmitting first instructions to the requesting device to decrypt the encrypted message using the second random quantum key; and render the logon widget using the logon widget instruction set; and in response to determining that the level of anomalies is above the predetermined anomalies threshold, transmitting second instructions to the requesting device to remove the encrypted message without decrypting the message.

7. The computer program product of claim 6, wherein the program code portions further comprise:

an executable portion configured for transmitting an eavesdropping notification message to an administrator of the computer system.

8. The computer program product of claim 6, wherein the program code portions further comprise:

an executable portion configured for, in response to the indication of eavesdropping by the third party, taking preemptive action regarding at least one present authentication process.

9. The computer program product of claim 8, wherein taking the preemptive action comprises transmitting a mitigation instruction to at least one additional requesting device, wherein the mitigation instruction is configured to cause the at least one additional requesting device to perform at least one action for mitigating a potential security exposure.

10. The computer program product of claim 9, wherein the mitigation instruction comprises instructions configured to cause the at least one additional requesting device to prevent rendering of all logon widgets.

11. A computer-implemented method for implementing a quantum key distribution (QKD)-secured logon widget, wherein a presence of an eavesdropping third party may be detected by comparison of quantum data corresponding to a first random quantum key sent from the computer system to a requesting device and quantum data corresponding to a second random quantum key sent from the requesting device to a computer system, the method comprising:

receiving, by a computer system, a request for authentication from a requesting device;

in response, generating, by the computer system, a first random quantum key using a first random measurement basis;

transmitting, by the computer system, over a fiber optic network, the first random quantum key to the requesting device, receiving, by a requesting device, a second random quantum key from the computer system, wherein the received second random quantum key may be identical to the first random quantum key:

measuring, by the requesting device, the second random quantum key using a second random measurement basis;

using the comparison basis result to determine a level of anomalies present in the second random quantum key and thereby the shared key;

based on the level of anomalies present in the second random quantum key, determine whether to render a logon widget in the requesting device;

in response to determining that the level of anomalies is below the predetermined anomalies threshold, transmitting instructions to the requesting device to decrypt the encrypted message using the shared second random quantum key; and render the logon widget using the logon widget instruction set; and in response to determining that the level of anomalies is above the predetermined anomalies threshold, transmitting instructions to the requesting device to delete remove the encrypted message without decrypting the message.

* * * * *